United States Patent
Berkoff

(10) Patent No.: US 9,872,080 B2
(45) Date of Patent: Jan. 16, 2018

(54) HOME NETWORK MEDIA TRANSPORT NEGOTIATION

(75) Inventor: Russell A. Berkoff, Sunnyvale, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 549 days.

(21) Appl. No.: 13/494,751

(22) Filed: Jun. 12, 2012

(65) Prior Publication Data

US 2013/0054754 A1    Feb. 28, 2013

Related U.S. Application Data

(60) Provisional application No. 61/527,983, filed on Aug. 26, 2011.

(51) Int. Cl.
| | |
|---|---|
| *G06F 15/16* | (2006.01) |
| *H04N 21/658* | (2011.01) |
| *H04L 29/06* | (2006.01) |
| *H04L 12/28* | (2006.01) |
| *H04N 21/436* | (2011.01) |
| *H04N 21/472* | (2011.01) |

(52) U.S. Cl.
CPC ....... *H04N 21/6582* (2013.01); *H04L 12/281* (2013.01); *H04L 12/2812* (2013.01); *H04L 65/1069* (2013.01); *H04L 65/4084* (2013.01); *H04L 65/602* (2013.01); *H04L 69/24* (2013.01); *H04N 21/43615* (2013.01); *H04N 21/47217* (2013.01)

(58) Field of Classification Search
CPC ... H04L 12/2812; H04L 12/281; H04L 69/24; H04N 21/43615; H04N 21/47217; H04N 21/6582

USPC .................................................. 709/219, 223
See application file for complete search history.

(56) References Cited

U.S. PATENT DOCUMENTS

2006/0041596 A1* 2/2006 Stirbu et al. .................. 707/200
2006/0294244 A1* 12/2006 Naqvi et al. .................. 709/227
(Continued)

FOREIGN PATENT DOCUMENTS

| EP | 1811476 A1 | 7/2007 |
|---|---|---|
| WO | 2011054318 A1 | 5/2011 |

OTHER PUBLICATIONS

International Search Report and Written Opinion dated Feb. 26, 2013 for International Application No. PCT/KR2012/006769 from Korean Intellectual Property Office, pp. 1-9, Seo-gu, Daejeon, Republic of Korea.

(Continued)

*Primary Examiner* — Hitesh Patel
(74) *Attorney, Agent, or Firm* — Sherman IP LLP; Kenneth L. Sherman; Hemavathy Perumal

(57) ABSTRACT

In a first embodiment of the present invention, a method for performing home networking media transport negotiation in a home network is provided, the method comprising: issuing a browse command on a content directory service in the home network to locate a custom resource element; and issuing an action to a media renderer in the home network to set a location of a media server to serve the item, wherein the issuing includes passing item metadata stored in the custom resource element, thus enabling the media renderer to negotiate directly with the media server while conveying detailed information about capabilities of the media renderer.

16 Claims, 3 Drawing Sheets

(56) References Cited

U.S. PATENT DOCUMENTS

| | | | |
|---|---|---|---|
| 2007/0033286 A1 | 2/2007 | Min | |
| 2007/0033288 A1 | 2/2007 | Kim et al. | |
| 2007/0156447 A1* | 7/2007 | Kim et al. | 705/1 |
| 2007/0260752 A1* | 11/2007 | Han | H04L 12/2803 709/248 |
| 2009/0043692 A1* | 2/2009 | Pippuri | G06F 17/30053 705/39 |
| 2010/0067872 A1* | 3/2010 | Jung | H04L 12/2805 386/241 |

OTHER PUBLICATIONS

European Search Report dated Apr. 20, 2015 for European Application No. 12827853.8 from European Patent Office, pp. 1-10, Munich, Germany.

Ritchie, J. et al., "UPnP AV Architecture:2 for UPnP Version 1.0", Dec. 31, 2010, pp. 1-35, UPnP Forum, United States.

* cited by examiner

HOME NETWORK MEDIA TRANSPORT NEGOTIATION

CROSS REFERENCE TO RELATED APPLICATIONS

This application claims the benefit of priority under 35 U.S.C. § 119(e) to U.S. Provisional Patent Application No. 61/527,983, filed on Aug. 26, 2011, which is incorporated herein by reference in its entirety for all purposes.

BACKGROUND OF THE INVENTION

1. Field of the Invention

The present invention relates generally to home networking. More specifically, the present invention relates to media transport negotiation in a home network.

2. Description of the Related Art

Universal Plug and Play (UPnP) is a distributed, open networking architecture that allows devices to connect seamlessly and to simplify the implementation of networks in the home (data sharing, communications, and entertainment) and corporate environments. UPnP achieves this by defining and publishing UPnP device control protocols built upon open, Internet-based communication standards.

UPnP has grown in popularity of late in part due to the rise in popularity of media servers. Media servers are small computers that store multiple types of content (e.g., photos, music, videos, etc.). The content may then be streamed from a media server to one or more control points (e.g., iPod, television set, etc.).

As an example, a "Media Server" device might contain a significant portion of the homeowner's audio, video, and still-image library. In order for the homeowner to enjoy this content, the homeowner must be able to browse the objects stored on the Media Server, select a specific one, and cause it to be "played" on an appropriate rendering device, using a Media Renderer. This process is currently performed using metadata published by the Media Server and the Media Renderer devices.

Normally, when a user wishes to display media on a UPnP device, the control point can send the device an action to fetch a Uniform Resource Locator (URL) and render it. The URL can be a link to an image, video, song file, etc.

General advances in computing technology now allow some Media Servers to dynamically modify content formats in real-time to meet custom requirements. This allows, for example, the content to be modified to meet the specifications of a particular presenter. A control point, however, may not have a complete understanding of the needs of a media renderer device. This is the case if the control point is not built into the media renderer. In this case, the control point can only rely on the list of media formats supported by the media Renderer. This list omits other relevant features of the Media Renderer, however, such as optimum resolutions, aspect rations, and other potentially adjustable content features.

Different televisions, for example, have different modes. A TV, for example, may support a movie mode, a sports mode, and an outdoor mode, each having their own display preferences on the television. Supporting this advance using existing static Media Server metadata, however, is difficult because the number of possible variations in content format is large and not known a priori. For example, there is currently no way to represent "movie mode," "sports mode," or "outdoor mode" using UPnP.

In addition, UPnP mechanisms do not depend on the specifics of content transport. For example, UPnP allows content to be transferred via IEEE-1394 (Firewire) or HTTP-GET or RTP. Any negotiation of content formats must be done outside of the media transport operation.

What is needed is a mechanism that allows for negotiation between a Media Server and a media renderer that works with existing UPnP or similar home networking architectures but allows custom negotiation of content formats.

SUMMARY OF THE INVENTION

In a first embodiment of the present invention, a method for performing home networking media transport negotiation in a home network is provided, the method comprising: issuing a browse command on a content directory service in the home network to locate a custom resource element; and issuing an action to a media renderer in the home network to set a location of a media server to serve the item, wherein the issuing includes passing item metadata stored in the custom resource element, thus enabling the media renderer to negotiate directly with the media server while conveying detailed information about capabilities of the media renderer.

In a second embodiment of the present invention, a method for performing home network media transport negotiation in a home network is provided, the method comprising: receiving an action from a control point at a media renderer in the home network to set a location of a media server to serve an item to the media renderer, wherein the action includes item metadata stored in a custom resource element found using a browse command by the control point, wherein the item metadata includes available transforms for the item; setting optimum transform parameters based on the media renderer capabilities; and negotiating directly with the media server using the optimum transform parameters and the media server location.

In a third embodiment of the present invention, a system in a home network is provided, comprising: a media server; a media renderer; and a control point; wherein the control point is configured to: issue a browse command on a content directory service in the home network to locate a custom resource element, wherein the custom resource element includes a metadata element containing a media server command network address and also includes a metadata element containing rules to convey session identification information; issue an action to a media renderer in the home network to set a location of a media server to serve the item, wherein the issuing includes passing item metadata stored in the custom resource element; wherein the media renderer is configured to: set a location of a media server to serve an item to the media renderer; receive the rules for conveying session identification information; receive the command network address to issue actions to the media server; and select a session identifier through an internal process; and issue one or more actions to the media server using the media server command network address and the chosen session identifier to convey capabilities of the media renderer to the media server; wherein the media server is configured to: associate the media renderer capabilities with the provided session identifier; and modify content requested by the media render.

In a fourth embodiment of the present invention, an apparatus for performing home networking media transport negotiation in a home network is provided, the apparatus comprising: means for issuing a browse command on a content directory service in the home network to locate a custom resource element; and means for issuing an action to a media renderer in the home network to set a location of a media server to serve the item, wherein the issuing includes passing item metadata stored in the custom resource element, thus enabling the media renderer to negotiate directly with the media server while conveying detailed information about capabilities of the media renderer.

In a fifth embodiment of the present invention, an apparatus for performing home network media transport negotiation in a home network, the apparatus comprising: means for receiving an action from a control point at a media renderer in the home network to set a location of a media server to serve an item to the media renderer, wherein the action includes item metadata stored in a custom resource element found using a browse command by the control point, wherein the item metadata includes available transforms for the item; means for setting optimum transform parameters based on media renderer capabilities; and means for negotiating directly with the media server using the optimum transform parameters and the media server location.

In a sixth embodiment of the present invention, a program storage device readable by a machine tangibly embodying a program of instructions executable by the machine to perform a method for performing home networking media transport negotiation in a home network, the method comprising: issuing a browse command on a content directory service in the home network to locate a custom resource element; and issuing an action to a media renderer in the home network to set a location of a media server to serve the item, wherein the issuing includes passing item metadata stored in the custom resource element, thus enabling the media renderer to negotiate directly with the media server while conveying detailed information about capabilities of the media renderer.

In a seventh embodiment of the present invention, a program storage device readable by a machine tangibly embodying a program of instructions executable by the machine to perform a method for performing home networking media transport negotiation in a home network, the method comprising: receiving an action from a control point at a media renderer in the home network to set a location of a media server to serve an item to the media renderer, wherein the action includes item metadata stored in a custom resource element found using a browse command by the control point, wherein the item metadata includes available transforms for the item; setting optimum transform parameters based on media renderer capabilities; and negotiating directly with the media server using the optimum transform parameters and the media server location.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

In an embodiment of the present invention, home networking media transport is accomplished through negotiation between a server and a renderer to arrive at a solution that works best for both. A renderer obtains a URL or other identification mechanism, then sends an action back to the server with a profile. The server can then modify the object and send it back to the renderer. By using the profile to send requirements back and forth, the system is able to complete a negotiation using traditional UPnP architectures yet still support custom negotiation of content formats.

It should be noted that the term "home networking" as used throughout this document refers to a type of network that is commonly used in homes to connect media devices. There is no requirement, however, that this type of networking actually be used in homes, as it has equal applicability for use in businesses or other entities. As such, the term "home networking" shall not be construed as limiting any embodiments of the present invention to use in a home, and shall be interpreted as any type of local area network (LAN).

Figure 1:
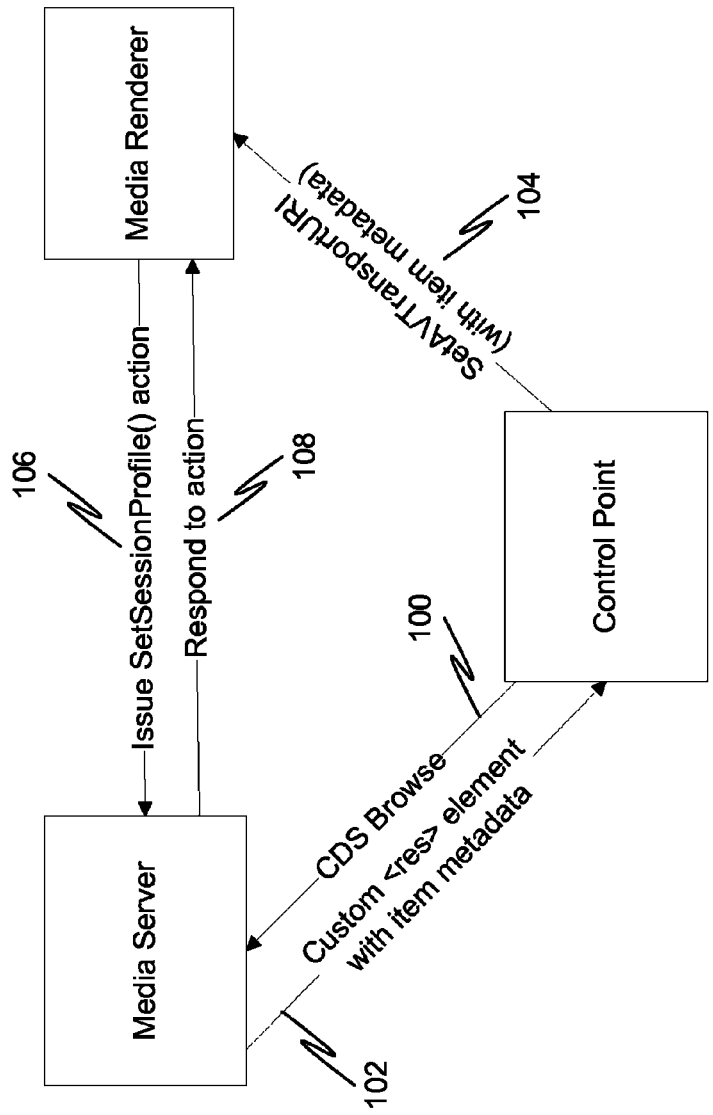
FIG. 1 is a diagram illustrating UPnP media transport negotiation using SOAP in accordance with an embodiment of the present invention.

FIG. 1 is a diagram illustrating UPnP media transport negotiation using SOAP in accordance with an embodiment of the present invention. At 100, the control point issues a content directory service (CDS) browse action and finds a custom type <res> element. At 102, the media server returns the custom <res> element with the item metadata. At 104, the control point then issues a SetAVTransportURI action and passes a URL value and item metadata to the media renderer. At 106, the media renderer sets the optimum transform parameters and issues a SetSessionProfile( ) action to the URL. Alternatively, the media renderer sends a profile to the media server. The media server can ignore this profile or optimize the content based on the profile. The media server could then send back what it decided to do. Then at 108, the server associates the provided Session Identifier with the Session Profile element provided and responds to the action.

As stated above, the control point can pass item metadata including available transforms to the media renderer. This metadata can be stored in a wide variety of formats, including a markup language. An example item metadata is as follows:
MediaServer item metadata

```
<item id="video_0001" restricted="1" parentID="video">
   ...
   <res id="video_0001_res_0001"
   protocolInfo="http-get:*:video/mpeg:">
      http://video_content/video_0001_res_0001
   </res>
   <upnp:resExt id="video_0001_res_0001">
      <upnp:sessionID type="http-header" />
      <upnp:sessionControlURI>
         http://mediaServer/SessionControl
      </upnp:sessionControlURI>
   </upnp:resExt>
</item>
ControlPoint initiates request to MediaRenderer
SetAVTransportURI(
   0,
   "http://video_content/video_0001_res_0001",
   "
      <item id="video_0001" restricted="1" parentID="video">
         ...
         <res id="video_0001_res_0001"
         protocolInfo="http-get:*:video/mpeg:">
            http://video_content/video_0001_res_0001
         </res>
         <upnp:resExt id="video_0001_res_0001">
            <upnp:sessionID type="http-header" />
            <upnp:sessionControlURI>
               http://mediaServer/SessionControl
            </upnp:sessionControlURI>
         </upnp:resExt>
      </item>
   " )
MediaRenderer negotiates with MediaServer (delivers SessionID
and SessionProfile to MediaServer)
         (SOAP action to URL: http://mediaServer/SessionControl)
SetSessionProfile(
   "<MediaRenderer_UUID>_Session_0001",
   "<sessionProfile xmlns="mediarenderer-vendor-namespace">
      ...
      < media renderer descriptive elements>
      ...
   </sessionProfile>
);
MediaRenderer issues HTTP-GET to obtain content from MediaServer
   (HTTP GET to URL: http://
<MediaServer_Host>/video_content/video_0001_res_0001)
GET video_content/video_0001/res_0001
SESSION.UPNP.ORG: <MediaRenderer_UUID>_Session_0001
MediaServer delivers customized playback content based on
MediaRenderer Session Profile
```

Figure 2:
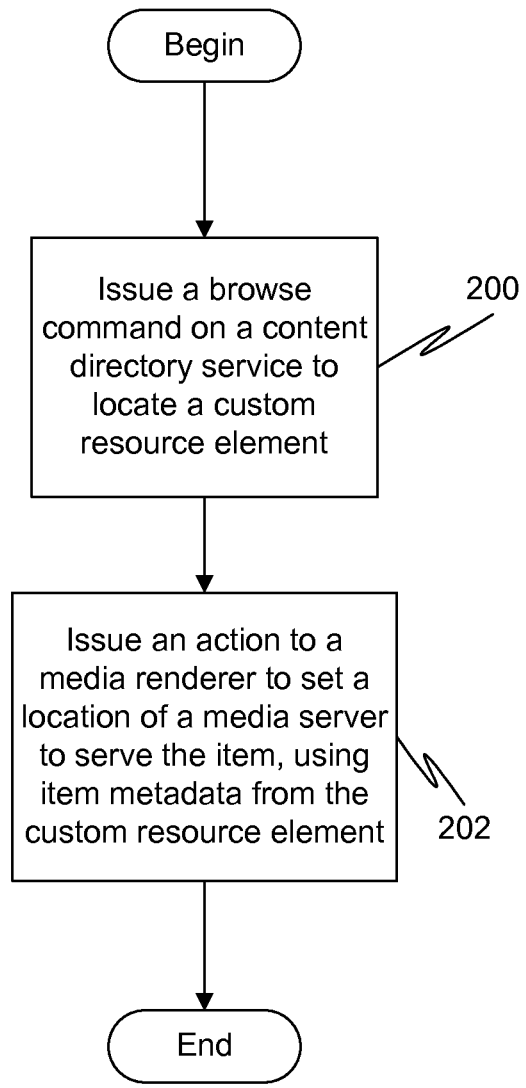
FIG. 2 is a flow diagram illustrating a method for performing home network media transport negotiation in a home network in accordance with one embodiment of the present invention.

FIG. 2 is a flow diagram illustrating a method for performing home network media transport negotiation in a home network in accordance with one embodiment of the present invention. This method is performed by the control point. At 200, a browse command (e.g., CDS::Browse) is issued on a content directory service in the home network to locate a custom resource element. The custom resource element can include transforms available for an item corresponding to the custom resource element. The custom resource element can includes rules for selecting and conveying session identifiers. At 202, an action is issued to a media renderer in the home network to set a location of a media server to serve the item. This issuing includes passing item metadata stored in the custom resource element, thus enabling the media renderer to negotiate directly with the media server while conveying detailed information about capabilities of the media renderer. This involves passing a SOAP or REST URL value, or other network address value.

Figure 3:
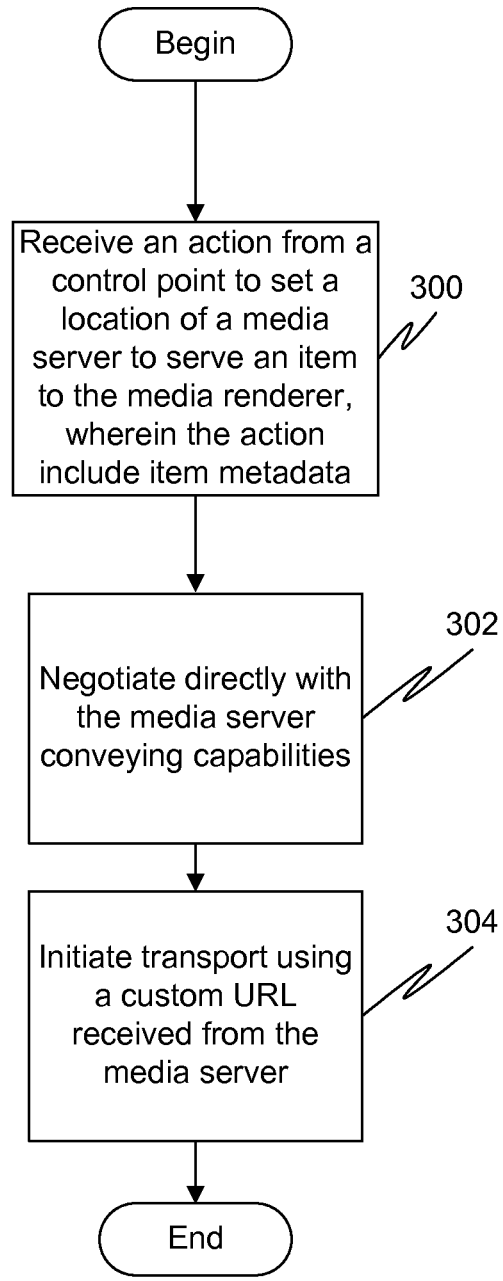
FIG. 3 is a flow diagram illustrating a method for performing home network media transport negotiation in a home network in accordance with one embodiment of the present invention.

FIG. 3 is a flow diagram illustrating a method for performing home network media transport negotiation in a home network in accordance with one embodiment of the present invention. This method is performed by the media renderer. At 300, an action is received from a control point to set a location of a media server to serve an item to the media renderer. The action includes item metadata stored in a custom resource element found using a browse command by the control point. The item metadata may include available transforms for the item. At 302, the media renderer negotiates directly with the media server conveying its capabilities. At 304, transport can be initiated using a custom URL received from the media server in response to the negotiating.

In another embodiment of the present invention, the method described above can be utilized for digital rights management (DRM) negotiations between the media server and the media renderer devices. DRM involves various protections to ensure that only legitimate users can view or play copyrighted material. DRM typically involves some measure of encryption of the content, of which only legitimate users can decrypt. As such, in order to implement DRM, it is often necessary for the content provider and the user to have knowledge about the others' encryption/decryption schemes. This information can be negotiated and exchanged though the present invention, which allows devices from, for example, different manufacturers to negotiate and exchange DRM encryption/decryption scheme, allowing a user on one device to view source material from another, different device. Additionally, an embodiment of the present invention could be used to negotiate DRM support.

In another embodiment of the present invention, extensions are provided to the Representational State Transfer (REST) protocol to implement the invention. REST is a style of software architecture for distributed systems such as the World Wide Web. REST has emerged over the past few years as a predominant Web service design model.

An important concept in REST is the existence of resources (sources of specific information), each of which is referenced with a global identifier (e.g., a URI in HTTP). In order to manipulate these resources, components of the network (user agents and origin servers) communicate via a standardized interface (e.g., HTTP) and exchange representations of these resources (the actual documents conveying the information).

In an embodiment of the present invention, a SOAP action can be mapped to a RESTful URL to implement the present invention.

Additionally, in an embodiment of the present invention, possible extensions are provided to the variety of actions that the media renderer could issue back to the media server.

In another embodiment of the present invention, the custom resource element includes a metadata element containing a media server command network address, such as a URL, and also includes a metadata element containing rules to convey session identification information. In such an embodiment, the media renderer then can additionally receive the rules for conveying session identification information and receive the command network address via this metadata. The media renderer can then select a session identifier through an internal process and issue one or more actions to the media server using the media server command network address and the chosen session identifier to convey the media renderer's capabilities to the media server. The media server can then be configured to associate the media render capabilities with the session identifier provided. When the media renderer subsequently issues a request for the media server content including the indicated session identifier using the rules provided to the media renderer in the custom resource element, the media server can then modify, optimize, and possibly transform the requested content to improve compatibility with and playback quality on the media renderer device.

A media renderer can reuse the same session identifier coordinate modifications across multiple transport sessions (for example, applying a consistent set of transforms across a separate video and audio transport session).

It should be noted that to one of ordinary skill in the art, the aforementioned example architectures can be implemented in many ways, such as program instructions for execution by a processor, as software modules, microcode, as computer program product on computer readable media, as logic circuits, as application specific integrated circuits, as firmware, as consumer electronic device, etc. and may utilize wireless devices, wireless transmitters/receivers, and other portions of wireless networks. Furthermore, embodiment of the disclosed method and system for displaying multimedia content on multiple electronic display screens can take the form of an entirely hardware embodiment, an entirely software embodiment, or an embodiment containing both software and hardware elements.

Additionally, the various components of the home network described above (e.g., media server, media renderer, control point, etc.) can be implemented on a wide variety of networked devices. Indeed, while each of these components are described separately and have different functions, it is even possible for two or more of them to be located on the exact same device. The choice of device will also vary based upon the home network. For example, some users prefer to play content on televisions, while others may prefer to play them on mobile devices such as mobile phones or tablets. In the former, the media renderer can be a television and in the latter it can be a mobile device. Similarly, the source of the content can be any networked device having access to storage, therefore making it possible that a mobile device, for example, can be a "media server". Thus the term "media server" is not to be taken as being limited to traditional hardware notions of what a server is.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods of the present invention, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

Although only a few embodiments of the invention have been described in detail, it should be appreciated that the invention may be implemented in many other forms without departing from the spirit or scope of the invention. Therefore, the present embodiments should be considered illustrative and not restrictive and the invention is not to be limited to the details given herein, but may be modified within the scope and equivalents of the appended claims.

What is claimed is:

1. A method for performing home networking media transport negotiation in a home network, the method comprising:
   at an electronic device in the home network:
      issuing a browse command to a content directory service on a media server in the home network to locate a universal plug and play (UPnP) custom resource element;
      receiving, from the media server, the custom resource element comprising item metadata for an item corresponding to the custom resource element; and
      issuing an action to a media renderer device in the home network to pass the item metadata to the media renderer device, the item metadata enabling the media renderer device to convey a profile to the media server for negotiating a content format directly with the media server over UPnP based on the profile, the profile comprising information about one or more capabilities of the media renderer device, the profile enabling the media server to transform requested media server content to customized playback content in the content format negotiated to improve compatibility with and playback quality on the media renderer device, and the item metadata including an available transform for the item for at least one of modifying, optimizing, and transforming the requested media server content to the customized playback content.

2. The method of claim 1, wherein the issuing an action includes passing a Simple Object Access Protocol (SOAP) Uniform Resource Locator (URL) value, and the custom resource element is stored in a markup language that provides custom negotiation of content formats.

3. The method of claim 1, further comprising:
   effecting the media renderer device to issue a request to the media server for the requested media server content, wherein the issuing an action includes passing one or more rules for selecting and conveying session identification information to the media renderer device, the one or more rules enabling the media renderer device to select a session identifier for use in issuing the request.

4. A method for performing home network media transport negotiation in a home network, the method comprising:
   at a media renderer device in the home network:
      receiving an action from a control point in the home network, wherein the action includes a universal plug and play (UPnP) custom resource element comprising item metadata for an item corresponding to the custom resource element; and
      using the item metadata to convey a profile to the media server for negotiating a content format directly with the media server over UPnP based on the profile, the profile comprising information about one or more capabilities of the media renderer device, the profile enabling the media server to transform requested content to customized playback content in the content format negotiated to improve compatibility with and playback quality on the media renderer device, and the item metadata including an available transform for the item for at least one of modifying, optimizing, and transforming the requested media server content to the customized playback content.

5. The method of claim 4, further comprising:
   at the media renderer device:
      initiating transport using a custom Uniform Resource Locator (URL) received from the media server in response to the negotiating.

6. A media renderer device in a home network, comprising:
   at least one processor; and a non-transitory processor-readable memory device storing instructions that when executed by the at least one processor causes the at least one processor to perform operations including:
   receiving, from a control point in the home network, a media server command network address for a media server in the home network; and
   issuing at least one action to the media server using the media server command network address to convey a profile to the media server for negotiating a content format directly with the media server over universal plug and play (UPnP) based on the profile;
   wherein the profile comprises information about one or more capabilities of the media renderer device;
   wherein the profile enables the media server to transform content requested by the media renderer device to customized playback content in the content format negotiated for improving compatibility with and playback quality on the media renderer device; and
   wherein the issuing at least one action to the media server includes passing item metadata for an item to the media server, the item metadata including an available transform for the item for at least one of modifying, optimizing, and transforming the content requested to the customized playback content.

7. The media renderer device of claim 6, wherein the media renderer device is located on a mobile device.

8. The media renderer device of claim 6, wherein the media server is located on a mobile device.

9. An apparatus for performing home networking media transport negotiation in a home network, the apparatus comprising:
   at least one processor; and
   a non-transitory processor-readable memory device storing instructions that when executed by the at least one processor causes the at least one processor to perform operations including:
     issuing a browse command to a content directory service on a media server in the home network to locate a universal plug and play (UPnP) custom resource element;
     receiving, from the media server, the custom resource element comprising item metadata for an item corresponding to the custom resource element; and
     issuing an action to a media renderer device in the home network to pass the item metadata to the media renderer device, the item metadata enabling the media renderer device to convey a profile to the media server for negotiating a content format directly with the media server over UPnP based on the profile, the profile comprising information about one or more capabilities of the media renderer device, the profile enabling the media server to transform requested media server content to customized playback content in the content format negotiated to improve compatibility with and playback quality on the media renderer device, and the item metadata including an available transform for the item for at least one of modifying, optimizing, and transforming the requested media server content to the customized playback content.

10. The apparatus of claim 9, wherein the issuing an action includes passing a Simple Object Access Protocol (SOAP) Uniform Resource Locator (URL) value.

11. A media renderer device for performing home network media transport negotiation in a home network, the media renderer device comprising:
   at least one processor; and
   a non-transitory processor-readable memory device storing instructions that when executed by the at least one processor causes the at least one processor to perform operations including:
     receiving an action from a control point in the home network, wherein the action includes a universal plug and play (UPnP) custom resource element comprising item metadata for an item corresponding to the custom resource element; and
     using the item metadata to convey a profile to the media server for negotiating a content format directly with the media server over UPnP based on the profile, the profile comprising information about one or more capabilities of the media renderer device, the profile enabling the media server to transform requested content to customized playback content in the content format negotiated to improve compatibility with and playback quality on the media renderer device, and the item metadata including an available transform for the item for at least one of modifying, optimizing, and transforming the requested media server content to the customized playback content.

12. The media renderer device of claim 11, wherein the media renderer device negotiates directly with the media server based on issuing an action to obtain the requested content from the media server.

13. The media renderer device of claim 12, wherein the action to obtain the requested content is a Simple Object Access Protocol (SOAP) action.

14. The media renderer device of claim 11, wherein the operations further comprise:
   initiating transport using a custom Uniform Resource Locator (URL) received from the media server in response to negotiating directly with the media server.

15. A non-transitory processor-readable medium that includes a program that when executed by a processor performs a method comprising:
   at an electronic device in the home network:
     issuing a browse command to a content directory service on a media server in the home network to locate a universal plug and play (UPnP) custom resource element;
     receiving, from the media server, the custom resource element comprising item metadata for an item corresponding to the custom resource element; and
     issuing an action to a media renderer device in the home network to pass the item metadata to the media renderer device, the item metadata enabling the media renderer device to convey a profile to the media server for negotiating a content format directly with the media server over UPnP based on the profile, the profile comprising information about one or more capabilities of the media renderer device, the profile enabling the media server to transform requested media server content to customized playback content in the content format negotiated to improve compatibility with and playback quality on the media renderer device, and the item metadata including an available transform for the item for at least one of modifying, optimizing, and transforming the requested media server content to the customized playback content.

16. A non-transitory processor-readable medium that includes a program that when executed by a processor performs a comprising:
   at a media renderer device in the home network:

receiving an action from a control point in the home network, wherein the action includes a universal plug and play (UPnP) custom resource element comprising item metadata for an item corresponding to the custom resource element; and using the item metadata to convey a profile to the media server for negotiating a content format directly with the media server over UPnP based on the profile, the profile comprising the one or more optimum transform parameters, the profile enabling the media server to transform requested content to customized playback content in the content format negotiated to improve compatibility with and playback quality on the media renderer device, and the item metadata including an available transform for the item for at least one of modifying, optimizing, and transforming the requested media server content to the customized playback content.

* * * * *